(12) United States Patent
Laarakkers et al.

(10) Patent No.: US 8,763,130 B2
(45) Date of Patent: Jun. 24, 2014

(54) PROTECTING A MOBILE DEVICE AGAINST A DENIAL OF SERVICE ATTACK

(75) Inventors: Jeroen Laarakkers, Nootdorp (NL); Frank Muller, Delft (NL)

(73) Assignee: Koninklijke KPN N.V., The Hague (NL)

( * ) Notice: Subject to any disclaimer, the term of this patent is extended or adjusted under 35 U.S.C. 154(b) by 1 day.

(21) Appl. No.: 12/997,232

(22) PCT Filed: Jun. 16, 2009

(86) PCT No.: PCT/EP2009/004352
§ 371 (c)(1),
(2), (4) Date: Dec. 9, 2010

(87) PCT Pub. No.: WO2010/003525
PCT Pub. Date: Jan. 14, 2010

(65) Prior Publication Data
US 2011/0093956 A1 Apr. 21, 2011

(30) Foreign Application Priority Data
Jun. 16, 2008 (EP) .................................... 08010876

(51) Int. Cl.
*G06F 21/00* (2013.01)

(52) U.S. Cl.
USPC ....... 726/25; 726/22; 726/24; 713/2; 713/188

(58) Field of Classification Search
USPC ......................................................... 726/25
See application file for complete search history.

(56) References Cited

U.S. PATENT DOCUMENTS

| | | | | |
|---|---|---|---|---|
| 5,594,227 A * | 1/1997 | Deo | | 235/380 |
| 6,195,695 B1 * | 2/2001 | Cheston et al. | | 709/221 |
| 7,685,174 B2 * | 3/2010 | Koestler | | 707/682 |
| 7,930,531 B2 * | 4/2011 | Chow et al. | | 713/2 |
| 2004/0127195 A1 * | 7/2004 | An | | 455/410 |
| 2004/0153724 A1 * | 8/2004 | Nicholson et al. | | 714/6 |
| 2004/0168201 A1 * | 8/2004 | Tada et al. | | 725/132 |
| 2005/0064859 A1 * | 3/2005 | Kotzin et al. | | 455/419 |
| 2005/0132206 A1 * | 6/2005 | Palliyil et al. | | 713/188 |
| 2006/0010314 A1 * | 1/2006 | Xu | | 713/2 |
| 2006/0015938 A1 * | 1/2006 | Wlodarczyk | | 726/22 |
| 2007/0174689 A1 * | 7/2007 | Chen | | 714/13 |
| 2008/0060075 A1 * | 3/2008 | Cox et al. | | 726/24 |

FOREIGN PATENT DOCUMENTS

| | | |
|---|---|---|
| EP | 1413980 | 4/2004 |
| WO | WO2004/038652 | 5/2004 |

OTHER PUBLICATIONS

European Search Report, European Patent Application No. 08010876.4, dated Feb. 19, 2009.
PCT International Search Report and Written Opinion, PCT International Application No. PCT/EP2009/004352 dated Jan. 19, 2010.
Bocan, Valer et al., "Mitigating Denial of Service Threats in GSM Networks", Proceedings of ARES 2006, The First International Conference on Availability, Reliability and Security, Vienna 2006, 6 pages.

* cited by examiner

*Primary Examiner* — Kambiz Zand
*Assistant Examiner* — Yonas Bayou
(74) *Attorney, Agent, or Firm* — McDonnell Boehnen Hulbert & Berghoff LLP

(57) ABSTRACT

A method of protecting a mobile device against malware is described. The mobile device comprises a backup operating system, the backup operating system being stored, preferably in a ROM, in the mobile device separately from the active operating system. The method comprises the steps of: providing a signal indicative of the possible presence of malware in the mobile device; and, replacing in response to the signal the active operating system with the backup operating system.

15 Claims, 2 Drawing Sheets

PROTECTING A MOBILE DEVICE AGAINST A DENIAL OF SERVICE ATTACK

CROSS-REFERENCE TO RELATED APPLICATIONS

This application is a national stage entry of PCT Patent Application No. PCT/EP2009/004352, filed on Jun. 16, 2009, which claims priority to EP Patent Application No. 08010876.4, filed on Jun. 16, 2008, all of which are incorporated herein for all purposes.

FIELD OF THE INVENTION

The invention relates to protecting a mobile device against a denial of service attack and, in particular, though not exclusively, to a method and a protection unit for protecting a mobile device against a denial of service attack.

BACKGROUND OF THE INVENTION

Denial of Service (DOS) attacks or Distributed Denial of Service (DDOS) attacks are characterized by an explicit attempt by attackers to prevent legitimate users of a mobile service from using that service. Such attacks can be directed at any device in the mobile network. Although a network itself is not so vulnerable for such attacks, the individual mobile end-terminals are, as nowadays such devices allow all kinds of software to be downloaded and to be executed via the operating system of the mobile device.

On the mobile device level, a DOS attack may be realized by malicious software, e.g. a virus or the like, which is designed to block access to the mobile services. Typically the attack is targeted to block or lock the mobile device and/or the removable smart-card, which may be located in the mobile device.

Mobile devices use smart cards for authentication purposes. The smart card may e.g. comprise a Subscriber Identity Module (SIM) holding a service-subscriber key (Ki) for authentication to a GSM-type network and/or a Universal Subscriber Identity Module (USIM) also holding a service-subscriber key (Ki) for authentication to a UMTS-type network. Further, the smart card may allow the mobile device to authenticate the user. To that end the mobile device requires the user to enter his or her Personal Identification Number (PIN) and subsequently sends an authentication command comprising the PIN to the (U)SIM. If the wrong PIN is entered more than three times, either the (U)SIM, the mobile device or both become locked.

A possible DOS attack could consist of malicious software (malware) which sends authentication commands with random data instead of the correct PIN to the (U)SIM. After the third time the (U)SIM is blocked for further access, making the mobile device at least temporarily useless. Using a further authentication code, the Personal Unblocking Code (PUC), the (U)SIM may be unblocked. A subsequent DOS attack on the basis of the PUC code would make the U(SIM) permanently useless as entering the wrong PUC ten times in a row unrecoverably blocks the (U)SIM. In that case a new smart card is required.

Hence, large distribution of such malware could result in a serious DOS attack which would take a significant number of mobile devices either temporarily or permanently out of order. Therefore, measures to protect mobile devices from such DOS attacks are needed.

One way of preventing DOS attacks is to improve the channel assignment in the GSM standard. In the article by Bocan et al (V. Bocan and V. Cretu, "Mitigating Denial of Service Threats in GSM Networks", Proceedings of ARES 2006, The First International Conference on Availability, Reliability and Security, Vienna 2006, pp. 523-528) an improved DOS-resistant GSM channel assignment process is proposed by adding pre-authentication information in the GSM channel assignment protocol. This technique however requires changes in the existing GSM networks and thus will be difficult to implement.

Another way of preventing DOS attacks is known from WO2004/038652. In this method a mobile device is blocked for a requested service after a predetermined number of failures to pass an authentication test. After each failure the user has to wait a predetermined time before the user is allowed to proceed with a subsequent authentication step. The introduction of such delay generates a temporary denial of services. The requested services will be blocked for a predefined time period which is long enough for the user to notice that something is wrong with the mobile device.

One disadvantage of this method is that if the user accidentally enters a wrong PIN, the device will be blocked for a considerable time before the user may enter the PIN for a second time. Further, this method only delays the DOS attack. Measures should be taken by an administrator or another capable person in order to deactivate the malicious code which executes the DOS attack. In many situations this may not be possible. If the temporarily denial of service caused by the delay is not timely noticed by the user, the mobile device will be blocked by the DOS attack.

A way of removing malware from the mobile device is known from U.S. 2005/0064859. In this method copies of various stages of the operating system of the mobile device are stored on a backup server in the network. If, by scanning the copies in the network with an up-to-date virusscanner, it is detected that malware is present on the mobile device, the backup server downloads an uninfected old version of the operating system to the mobile device to replace the newer infected version. In fact the use of this prior art method ensures that the network always has the most recent and most sophisticated version of the up-to-date virusscanner available. However, this method does not prevent malware that has reached the mobile device, from rendering the (U)SIM useless, as the mobile device itself is not able to detect the malware and act accordingly. If the (U)SIM is not operating any more, it is in most cases not even possible to download a new operating system to the mobile device. Even if a new operating system has been downloaded, the mobile device is still unusable because the (U)SIM is out of order.

U.S. patent application publication 2006/0010314 describes running multiple operating systems on a mobile device, while preserving the original one. The method provides solutions to ensure that newer parts of the operating system, called 'guest OS', do not erase the original OS, called 'host OS'. U.S. patent application publication 2006/0010314, however, does not give any teaching how to detect the presence of malware in either the host OS or the guest OS nor does it teach how to act in situations where the mobile device is infected with malware. The U.S. patent application publication 2006/0010314 in fact does not make any hint to malware or other third party operating systems into the device. Moreover the multiple operating systems as disclosed in U.S. patent application publication 2006/0010314 are running independently one of another without any interaction therebetween, other than preserving the original running operating system and other than to run a guest OS or application from within the host OS in a mobile device.

SUMMARY OF THE INVENTION

It is an object of the invention to reduce or eliminate at least one of the drawbacks known in the prior art and to provide in a first aspect of the invention a method of protecting a mobile device against malware. The mobile device comprises a backup operating system, the backup operating system being stored, preferably in a Read Only Memory (ROM), in the mobile device separately from an active operating system. The method comprises the steps of: providing preferably inside the mobile device or generated by a user of the mobile device a signal indicative of an assumed presence of malware in the mobile device. The method can then in addition comprise the step of, in the mobile device replacing in response to the signal the active operating system with the backup operating system.

An assumed presence of malware can for example mean that the device contains intelligence, preferably programmed as algorithms in processor code, preferably in the back-up operating system, to analyse signals representative for or from inside the functioning of the device. The analysis software provides then a positive or negative indication of the presence of malware in the mobile device. The analysis software can be complemented with co-running software means for immediately triggering the replacement software of the backup operating system to become active. An assumed presence of malware and the possible subsequent remedy actions as to the device can also be triggered by human intelligence.

Hence, after the reception of an indication of possible malware, the method allows the running operating system to be replaced with the backup operating system so that the malicious code is removed on the spot. The invention thus provides a simple and very effective way of removing malware from a mobile device. The method is very hard to compromise because the backup operating system is implemented in the hardware of the mobile device, e.g. a ROM.

In an embodiment a predetermined number of subsequent failures to pass an authentication test on the mobile device and/or changes in the active OS provide a signal indicative of a possible presence of malware in the mobile device.

In another embodiment the method further comprises the steps of: counting the number of failures to pass the authentication test; and, replacing the active operating system with the backup operating system on the condition that the number of failures is equal to a predetermined maximum Nmax and the active operating system differs from the backup operating system. A predetermined number of subsequent registered failures provide a strong indication of the possible presence of malware in the mobile device. The predetermined number of subsequent failures Nmax may be set to below the maximum number of failures allowed by the authentication test. In this way the method is capable of avoiding e.g. that the SIM will be reversibly or irreversibly blocked by malware sending the wrong PIN or PUC to the mobile device.

In an embodiment the method further comprises the steps of comparing at least part of the active operating system of the mobile device with at least part of an backup operating system; and, replacing the active OS with the backup operating system on the basis of the detection of changes in the running operating system.

In one embodiment the method further comprises the steps of: counting the number of failures to pass the authentication test; comparing at least part of the active operating system of the mobile device with at least part of an backup operating system; and, replacing the active operating system with the backup operating system on the condition that the number of failures is equal to a predetermined number Nmax and that the active operating system differs from the backup operating system. Combining two or more signals indicative of the possible presence of malware further improves the reliability of indication that the mobile device may indeed be infected. The reliability of the indication is important as flushing the running operating system is a rather drastic measure.

In yet another embodiment the authentication test uses an authentication code received by the mobile device and a predetermined code stored in the mobile device or stored in a removable smart card located in the mobile device.

In one embodiment the authentication test is a Personal Identification Number (PIN) type authentication test, wherein the test blocks the mobile device and/or a SIM card located in the mobile device after a predetermined number of subsequent failures of the test as defined by the PIN type authentication test.

In another embodiment the authentication test is a Personal Unblocking Code (PUC) type authentication test for unblocking a mobile device and/or a SIM card located in the mobile device, wherein the test blocks the mobile device and/or a SIM card after a predetermined number of subsequent failures of the test as defined by the PUC type authentication test.

In one embodiment the step of comparing the active OS with the backup OS comprises comparing hash type values of the respective operating systems. Using hash functions is an effective comparison between parts of the running OS and parts of the backup OS.

In a further aspect the invention relates to a protection unit for a mobile device. The mobile device comprises a backup operating system, the backup operating system being stored, preferably in a ROM, in the mobile device separately from an active operating system. The protection unit comprises: means for receiving a signal indicative of an assumed presence of malware in the mobile device; the signal being generated inside the mobile device or by a user of the mobile device; and, means for replacing the active operating system with the backup operating system. The protection unit thus provides a simple hardware solution for protecting mobile devices against DOS attacks which can be easily implemented in various types of mobile devices.

An assumed presence of malware can for example mean that the device contains intelligence, preferably programmed as algorithms in processor code, preferably in the back-up operating system, to analyse signals representative for or from inside the functioning of the device. The analysis software provides then a positive or negative indication of the presence of malware in the mobile device. The analysis software can be complemented with co-running software means for immediately triggering the replacement software of the backup operating system to become active. An assumed presence of malware and the possible subsequent remedy actions as to the device can also be triggered by human or a living being intelligence.

In one embodiment of the protection unit, a predetermined number of subsequent failures to pass an authentication test on the mobile device and/or changes in the active OS provide a signal indicative of a possible presence of malware.

In another embodiment the protection unit further comprises means for counting the number of failures to pass the authentication test on the mobile device and/or means for comparing the active operating system with the backup operating system.

In yet another embodiment the means for replacing the active operating system with the backup operating system is configured to replace the running OS on the condition that the number of failures to pass the test is equal to a predetermined maximum Nmax and/or on the condition that the active operating system differs from the backup operating system.

In another aspect the invention relates to a mobile device comprising a malware protection unit as described in the embodiments above.

In yet another aspect the invention relates to a computer program product comprising software code portions configured for, when run in the memory of a mobile device comprising a backup operating system, executes the method steps as described in the embodiments above.

The invention will be further illustrated with reference to the attached drawings, which schematically will show embodiments according to the invention. It will be understood that the invention is not in any way restricted to these specific embodiments.

DETAILED DESCRIPTION

Figure 1:
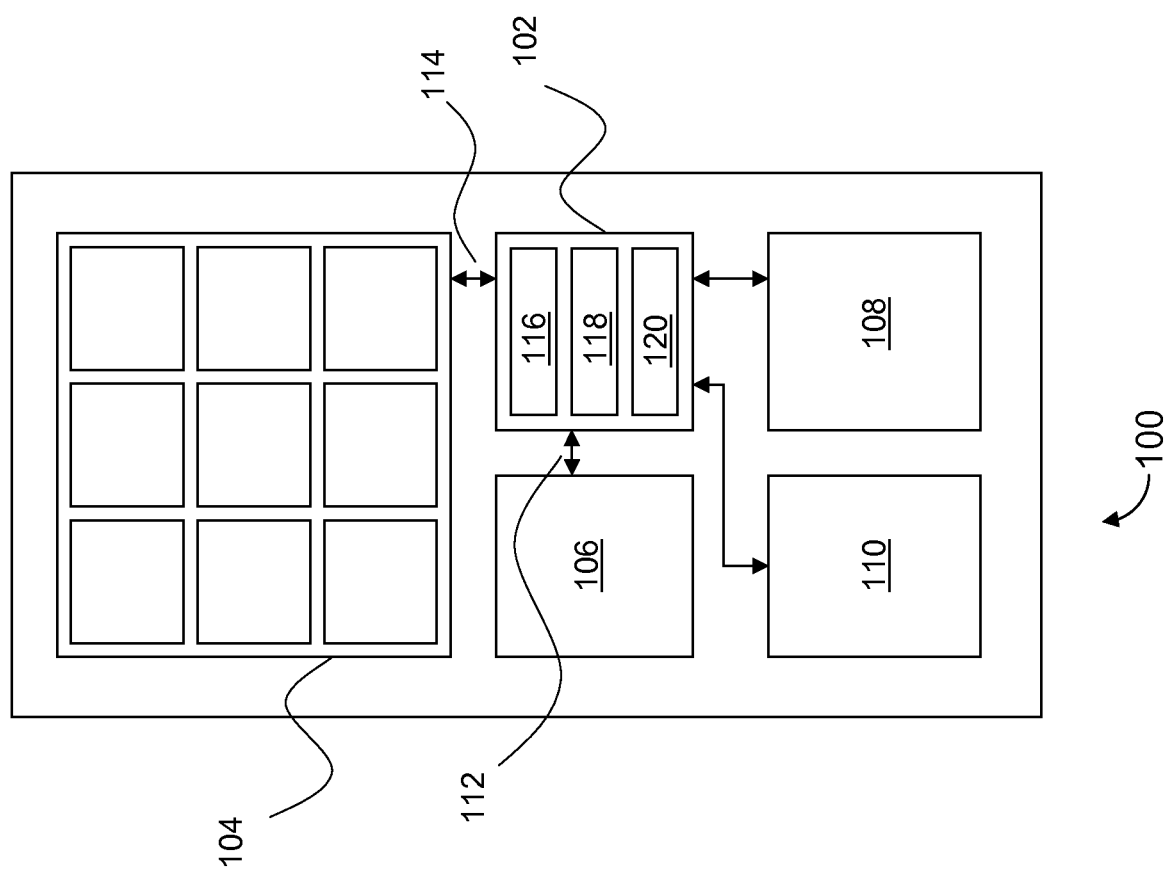
FIG. 1 depicts a schematic representation of mobile device comprising a malware protection unit according to an embodiment of the invention.

FIG. 1 illustrates a typical mobile device 100 comprising a malware protection unit 102 according to one embodiment of the invention. The mobile device may be a smart phone, a personal digital assistant (PDA), a laptop or any other mobile communications device capable of providing services over one or more mobile networks. The mobile device comprises an input terminal 104, e.g. a keypad or a touch screen, allowing a user to enter a personal code, e.g. a PIN or a PUC. Further, the mobile device may comprise a smart card 106 for authentication purposes.

The smart card may comprise a SIM for authentication to a GMS type network and/or a USIM for authentication to an UMTS type network. CDMA-based mobile devices often use a Removable User Identity Module (RUIM). Many CDMA-based standards however do not include any such card. In that case authentication to the network is based on a unique code contained in the mobile device itself. The smart card comprising the SIM or the USIM or—in the case of e.g. a CDMA-based mobile device—the mobile device itself are capable of receiving an authentication command comprising the PIN or PUC received by the mobile device via the input terminal.

The mobile device further comprises a memory with an Operating System (OS) 108, e.g. a Microsoft® OS, a Unix type OS such as Linux® mobile OS or a proprietary OS, which is responsible for the management and coordination of the activities and the sharing of the resources of the mobile device. Besides the memory with the active (running) OS, the mobile device further comprises a backup OS 110. Preferably, the backup OS is permanently stored in a ROM type chip or any other storage device which allows tamper-free, permanent storage of the OS. Such hardware implementation allows a very robust solution against malware.

The mobile device further comprises a malware protection unit 102, which is connected to the input terminal 104, the smart card 106, the running OS 108 and the backup OS 110. The protection unit is capable of receiving a signal 112 indicative of the possible presence of malware in the mobile device. Such signal may be provided by a smart card, e.g. a (U)SIM or the like, or by the mobile device itself (e.g. in the case of a CDMA-based mobile device). In that case, the SIM or the mobile device informs the protection unit of each failure of a user to enter a correct PIN or PUC code into the input terminal. When a failure occurs it is registered. A number of subsequent failures is an indication that malware is present on the mobile device. The larger the number of failures, the stronger the indication. Hence, after a predetermined number of failures the protection unit may decide to flush the running OS. Another signal indicative of the possible presence of malware are changes in the running operating system.

The protection unit may also receive other signals which indicate the possible presence of malware in the mobile device. For instance, the signal may also be a user generated signal 114, e.g. by pushing a predetermined button of the input terminal of the mobile device. The protection unit may use combinations of these signals for deciding to flush the running operating system. In one embodiment the protection unit checks whether the active (running) OS has been modified after a predetermined number Nmax of failures to pass an authentication test.

Changes in the running OS may be detected by comparing the running OS with the backup OS. To that end, the protection unit comprises a comparison function 116 in the form of a mathematical algorithm which is capable of finding differences between the active and the backup OS. In one preferred embodiment, the mathematical algorithm comprises a set of hash functions which are capable of producing hash values. By comparing the hash values of both operating systems differences between the operating systems may be efficiently detected.

The protection unit further comprises a flush function 118. The flush function is capable of replacing the active, infected OS, with a clean copy of the backup OS stored in the ROM or any other storage device which allows tamper-free and/or permanent storage of the OS. Any previously downloaded software, including the malware, will be flushed and replaced by a clean OS. Although flushing the OS may be a quite rigorous measure, it is preferred over a permanently blocked SIM.

The protection unit also comprises a counter N 120 for registering failures of the PIN and/or PUC authentication test. When turning on the power of the mobile device, the counter is set to zero. Failure of entering the correct PIN or PUC will increase the counter N by one and successful input of the PIN or PUC will set the counter back to zero.

After a predetermined number of failures Nmax the protection unit will check whether changes in the running OS are present. If this is the case, the protection unit will flush the running OS with a backup OS. In one embodiment, the flushing will not affect the counter. Hence—after flushing the operating system—the input of further incorrect codes will block the mobile device. If no changes in the running OS have been detected, presumably the failure is caused by a wrong entry of the authentication code. In that case the user is offered a further chance to enter the correct authentication code.

Preferably the functionality in the protection unit may be implemented as one or more executable software programs. Similar to the backup OS, these programs may be programmed in a ROM chip, so that it is very difficult or impossible for malicious code to manipulate or change these functions.

Figure 2:
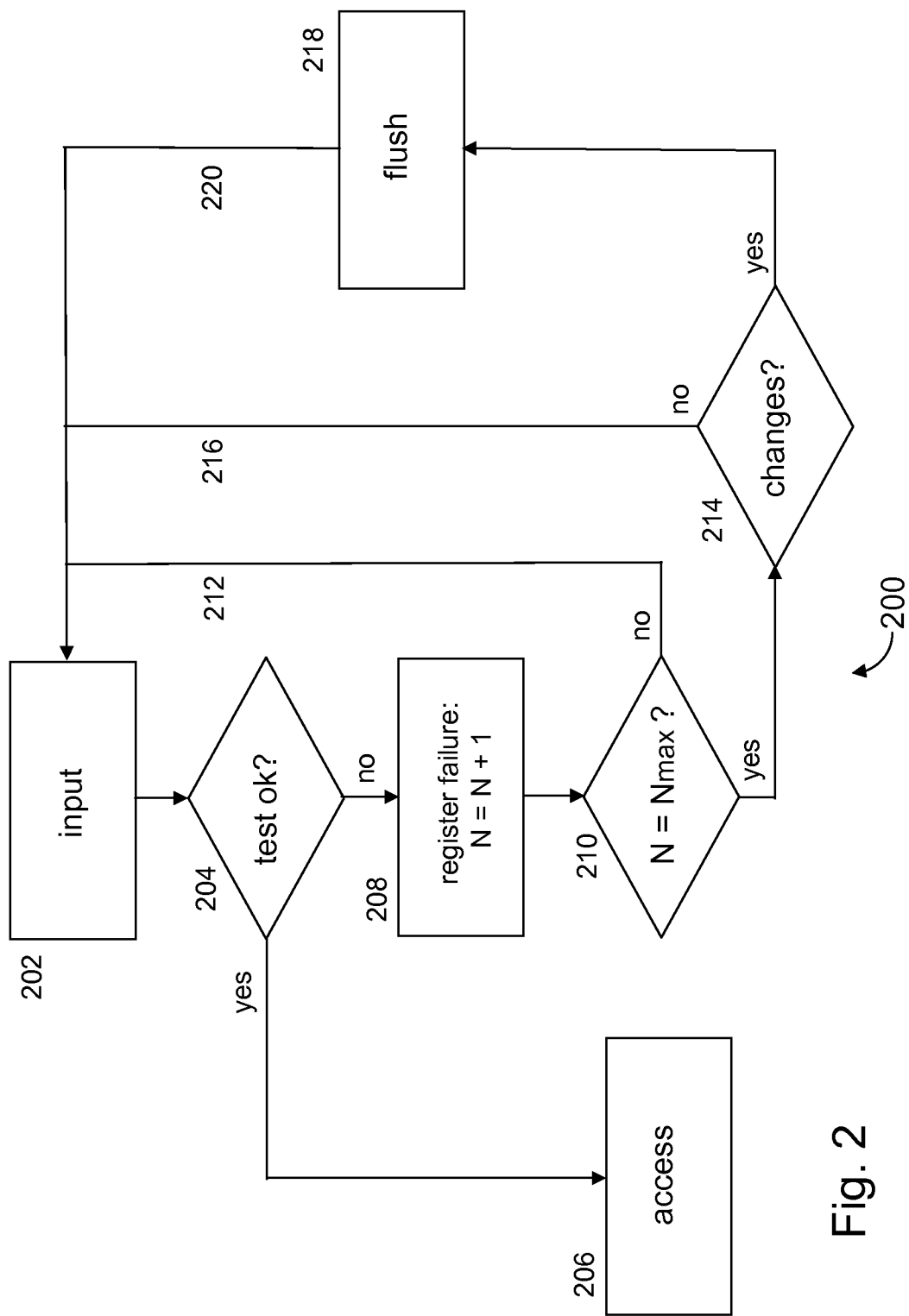
FIG. 2 depicts a flow diagram of the method according to one embodiment of the invention.

FIG. 2 illustrates a typical flow diagram 200 of a method according to one embodiment of the invention. In step 202 the mobile device requests the user to enter an authentication code (e.g. PIN or PUC). Thereafter, in step 204 the authentication test is executed and a signal indicating whether the test is successful or not is returned to the mobile device. If the test is successful, the user is given access to the mobile device (step 206).

Failure of the test 204 is regarded as an indication that the mobile device may be infected with malware. Hence, in that case the malware protection unit in the mobile device registers the failure to pass the authentication test by increasing a counter N by one unit (step 208). Subsequently, the protection unit checks whether the counter has reached a predetermined maximum Nmax (step 210). If the maximum has not been reached the user is offered a further chance to enter the correct authentication code (step 212). If the maximum has been reached the protection unit checks, using e.g. hashing techniques, whether differences are present between the running OS and the backup OS (step 214). If no differences are detected the user is offered a further chance to enter the correct authentication code (step 216). If a difference is detected the protection unit will flush the running OS thereby replacing the running OS with a copy of the backup OS (step 218). The new OS will be rebooted and bringing the procedure back to the initial situation wherein the user has to enter his or her personal code (step 220).

The predetermined maximum Nmax is set to a number which is less than the maximum number of subsequent failures allowed by an authentication test (e.g. three for the PIN authentication test and ten for the PUC authentication test). The higher the number of subsequent failures, the stronger the indication that malware is present on the mobile device. Moreover, failure of the PUC test results in permanent blockage of the mobile device and/or (U)SIM. Hence, a preferred implementation of the method is at the level of the PUC authentication in which Nmax is set to nine, i.e. just below the maximum number of subsequent failures defined by the PUC test.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of protecting a mobile device against malware, the method comprising:
    providing a signal indicative of a possible presence of malware in a mobile device comprising an active operating system, a backup operating system, and at least one of a Subscriber Identity Module (SIM), a Universal SIM (USIM), a Removable User Identity Module (RUIM), and a Code-Division Multiple Access (CDMA) authentication code, wherein the backup operating system is stored in a read-only memory (ROM) located in the mobile device separately from the active operating system; and
    replacing in response to the signal the active operating system with a copy of the backup operating system.

2. The method according to claim 1, wherein a predetermined number of subsequent failures to pass an authentication test on the mobile device and/or changes in the active operating system provide a signal indicative of a possible presence of malware.

3. The method according to claim 2, further comprising:
    counting the number of failures to pass the authentication test; and,
    replacing the active operating system with the backup operating system on the condition that the number of failures is equal to a predetermined number Nmax.

4. The method according to claim 2, further comprising:
    counting the number of failures to pass the authentication test;
    comparing at least part of the active operating system of the mobile device with at least part of the backup operating system; and,
    replacing the active operating system with the backup operating system on the condition that the number of failures is equal to a predetermined maximum Nmax and that the active operating system with differs from the backup operating system.

5. The method according to claim 2, wherein the authentication test uses an authentication code received by the mobile device and a predetermined code stored in the mobile device or stored in a removable smart card located in the mobile device.

6. The method according to claim 2, wherein the authentication test is a Personal Identification Number (PIN) type authentication test, the test blocking the mobile device and/or the subscriber identity module (SIM) card after a predetermined number of subsequent failures of the test as defined by the PIN type authentication test.

7. The method according to claim 2, wherein the authentication test is a Personal Unblocking Code (PUC) type authentication test for unblocking the mobile device and/or the subscriber identity module (SIM) card located in the mobile device, the test blocking the mobile device and/or the SIM card after a predetermined number of subsequent failures of the test as defined by the PUC type authentication test.

8. The method according to claim 1, further comprising:
    comparing at least part of the active operating system of the mobile device with at least part of the backup operating system; and,
    replacing the active operating system with the backup operating system on the basis of the detection of changes in the active operating system.

9. The method according to claim 8, wherein the step of comparing the active operating system with the backup operating system comprises comparing hash type values of the respective operating systems.

10. A malware protection unit for a mobile device comprising and at least one of a Subscriber Identity Module (SIM), a Universal SIM (USIM), a Removable User Identity Module (RUIM), and a Code-Division Multiple Access (CDMA) authentication code, the mobile device comprising an active operating system and a backup operating system, the backup operating system being stored in a read only memory (ROM) located in the mobile device separately from the active operating system, the malware protection unit comprising:
    means for receiving a signal indicative of a possible presence of malware in the mobile device; and
    means for replacing the active operating system with a copy of the backup operating system.

11. The malware protection unit according to claim 10, wherein a predetermined number of subsequent failures to pass an authentication test on the mobile device and/or changes in the active operating system provide a signal indicative of a possible presence of malware.

12. The malware protection unit according to claim 10, the malware protection unit further comprising means for counting the number of failures to pass the authentication test on the mobile device and/or means for comparing the active operating system with the backup operating system.

13. The malware protection unit according to claim 10, wherein the means for replacing the active operating system with the backup operating system is configured to replace the running operating system on the condition that the number of failures to pass the test is equal to a predetermined maximum Nmax and/or on the condition that the running operating system differs from the running operating system.

14. A mobile device, comprising:
- at least one of a Subscriber Identity Module (SIM), a Universal SIM (USIM), a Removable User Identity Module (RUIM), and a Code-Division Multiple Access (CDMA) authentication code;
- an active operating system;
- a read only memory (ROM) storing a backup operating system; and
- a malware protection unit, comprising: means for receiving a signal indicative of a possible presence of malware in the mobile device; and
- means for replacing the active operating system with a copy of the backup operating system.

15. A non-transitory computer storage medium comprising software code portions configured for, when run in a memory of the mobile device of claim 1 executing the method of claim 1.

* * * * *